US011629882B1

United States Patent
Choi et al.

(10) Patent No.: US 11,629,882 B1
(45) Date of Patent: Apr. 18, 2023

(54) HEAT EXCHANGER

(71) Applicants: Jin Min Choi, Seoul (KR);
Sung-Hwan Choi, Seoul (KR)

(72) Inventors: Jin Min Choi, Seoul (KR);
Sung-Hwan Choi, Seoul (KR)

(*) Notice: Subject to any disclaimer, the term of this patent is extended or adjusted under 35 U.S.C. 154(b) by 0 days.

(21) Appl. No.: 17/739,778

(22) Filed: May 9, 2022

(30) Foreign Application Priority Data

Oct. 13, 2021 (KR) .................. 10-2021-0136040

(51) Int. Cl.
*C23C 14/34* (2006.01)
*F24H 9/00* (2022.01)
*F24H 8/00* (2022.01)
*F28D 9/00* (2006.01)
*F28D 21/00* (2006.01)

(52) U.S. Cl.
CPC ............. *F24H 9/0015* (2013.01); *F24H 8/00* (2013.01); *F24H 9/0026* (2013.01); *F28D 9/0093* (2013.01); *F28D 2021/0024* (2013.01)

(58) Field of Classification Search
CPC ........ F34H 9/0015; F34H 9/0026; F24H 8/00; F28D 9/0093; F28D 2021/0024
USPC ........................................................ 165/177
See application file for complete search history.

(56) References Cited

U.S. PATENT DOCUMENTS

| 11,293,702 | B2* | 4/2022 | Wada .................. F24H 8/00 |
| 11,421,946 | B2* | 8/2022 | Wada .................. F28F 9/02 |
| 2020/0208923 | A1* | 7/2020 | Wada .................. F24H 1/445 |
| 2021/0247100 | A1* | 8/2021 | Ohigashi ............. F28D 7/0075 |
| 2021/0262697 | A1* | 8/2021 | Horiuchi ............ F28D 7/1623 |

FOREIGN PATENT DOCUMENTS

| KR | 10-0392596 B1 | 7/2003 |
| KR | 10-2018-0007984 A | 1/2018 |
| KR | 10-2019-0138585 A | 12/2019 |
| KR | 10-2210094 B1 | 2/2021 |
| WO | 2017/171276 A1 | 10/2017 |

OTHER PUBLICATIONS

An Office Action mailed by the Korean Intellectual Property Office dated Jun. 28, 2022, which corresponds to Korean Patent Application No. 10-2021-0136040 and is related to U.S. Appl. No. 17/739,778.
International Search Report issued in PCT/KR2022/015386; dated Feb. 1, 2023.

* cited by examiner

*Primary Examiner* — Joel M Attey
(74) *Attorney, Agent, or Firm* — Studebaker & Brackett PC

(57) ABSTRACT

A heat exchanger for heating a fluid flowing through a pipe using a combustion gas includes: a body including open upper and lower ends and having a space formed therein to allow the combustion gas to pass therethrough; a combustor formed in an upper portion of the space in which combustion of the combustion gas occurs; a heat exchange portion formed below the combustor and provided with a heat exchange pipe configured to heat an internal fluid by using the combustion gas; and a heat return pipe provided outside the space so as to be in contact with an outer surface of the body, wherein the combustor and the heat exchange portion may be unitarily formed, and the body in which the combustor is formed includes a concave portion protruding concavely inward so as to correspond to a shape of an outer circumferential surface of the heat return pipe.

17 Claims, 5 Drawing Sheets

HEAT EXCHANGER

CROSS-REFERENCE TO RELATED APPLICATION

This application claims priority under 35 U.S.C. § 119 to Korean Patent Application No. 10-2021-0136040, filed on Oct. 13, 2021, in the Korean Intellectual Property Office (KIPO), the disclosure of which is incorporated by reference herein in its entirety.

1. Technical Field

Embodiments of the present disclosure relate to a heat exchanger, and more particularly, to a heat exchanger in which a sensible heat exchanger and a latent heat exchanger are unitarily formed.

2. Discussion of Related Art

Heat exchangers, which allow crossing of a heating fluid and a fluid to be heated that have different temperatures from each other to achieve heat transfer, are used to heat a low-temperature water circulating in a boiler or a water heater and supply a hot water or heating water.

In the case of a condensing boiler, the heat exchanger includes a sensible heat exchanger using sensible heat and a latent heat exchanger using latent heat, which are provided separately. However, when the sensible heat exchanger and the latent heat exchanger are separately provided, there may be a difficulty in the manufacturing process and the manufacturing cost may increase because airtightness should be maintained therebetween along with mechanical coupling.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY

Embodiments of the present disclosure may be directed to a heat exchanger in which a sensible heat exchanger and a latent heat exchanger are unitarily formed.

According to an embodiment, a heat exchanger for heating a fluid flowing through a pipe by using a combustion gas includes: a body including upper and lower ends which are open and having a space formed therein to allow the combustion gas to pass therethrough; a combustor formed in an upper portion of the space in which combustion of the combustion gas occurs; a heat exchange portion formed below the combustor and provided with a heat exchange pipe configured to heat an internal fluid by using the combustion gas; and a heat return pipe provided outside the space so as to be in contact with an outer surface of the body, wherein the combustor and the heat exchange portion may be unitarily formed, and the body in which the combustor is formed includes a concave portion protruding concavely inward so as to correspond to a shape of an outer circumferential surface of the heat return pipe.

In some embodiments, the heat exchange pipe may include: a first heat exchange pipe disposed in an upper area of the heat exchange portion to be adjacent to the combustor so as to heat the internal fluid by using a sensible heat of the combustion gas; a third heat exchange pipe disposed below the combustor to heat the internal fluid by using a latent heat of condensation of the combustion gas; and a second heat exchange pipe disposed between the first heat exchange pipe and the third heat exchange pipe.

In some embodiments, the second heat exchange pipe may be configured to heat the internal fluid by using at least one of the sensible heat and the latent heat of condensation of the combustion gas.

In some embodiments, each of the heat exchanger and the heat return pipe may have a circular or oval cross-sectional shape.

In some embodiments, the heat exchanger may further include a turbulator disposed in the heat exchange pipe to induce turbulence in flow of the fluid.

In some embodiments, a plurality of heat exchange pins for increasing a heat transfer rate may be disposed on an outer circumferential surface of the heat exchange pipe to be spaced apart from each other at predetermined intervals.

In some embodiments, a half of a circumference of an outer circumferential surface of the heat return pipe may be in surface contact with an outer surface of the concave portion.

In some embodiments, the body may include a front plate and a rear plate in which the concave portion is formed, and a left passage cap and a right passage cap coupled to opposite ends of the front plate and the rear plate to define the space, and a connection pipe connecting the heat exchange pipe and the heat return pipe may be coupled to the left passage cap.

In some embodiments, the front plate and the rear plate may include an upper front plate and an upper rear plate forming an exterior of the combustor, and a lower front plate and a lower rear plate forming an exterior of the heat exchange portion, and the upper front plate and the lower front plate may be unitarily formed, and the upper rear plate and the lower rear plate may be unitarily formed.

In some embodiments, the front plate and the rear plate may include the upper front plate and the upper rear plate disposed at a height corresponding to the combustor to contact the heat return pipe, and the lower front plate and the lower rear plate disposed below the upper front plate and the upper rear plate, respectively, at a height corresponding to the heat exchange portion, and the upper front plate and the lower front plate may be unitarily formed, and the upper rear plate and the lower rear plate may be unitarily formed.

In some embodiments, the first heat exchange pipe may include upper first heat exchange pipes provided in a first number to be spaced apart from each other in a horizontal direction between the front plate and the rear plate, and lower first heat exchange pipes having the same arrangement as the upper first heat exchange pipes and spaced apart from a lower side of the upper first heat exchange pipes by a predetermined distance.

In some embodiments, the second heat exchange pipes may be provided in a second number less than the first number and spaced apart from each other in the horizontal direction between the front plate and the rear plate.

In some embodiments, each of the second heat exchange pipes may be positioned between each of the first heat exchange pipes.

In some embodiments, the third heat exchange pipes may be provided in a third number less than the second number, and each of the third heat exchange pipes may be positioned between each of the second heat exchange pipes.

In some embodiments, the front plate and the rear plate may include first inclined portions formed to be inclined and become closer to each other in a direction from a position of a lower end of the first heat exchange pipe toward a position of the second heat exchange pipe, and second inclined portions formed to be inclined and become closer to each other in a direction from a position of the second heat exchange pipe toward a position of the third heat exchange pipe.

In some embodiments, the left passage cap and the right passage cap may include an upper left passage cap and an upper right passage cap which form an appearance of the combustor and have a heat-return-pipe fluid recess communicating with at least a portion of the heat return pipe, and a lower left passage cap and a lower right passage cap which have a heat-exchange-pipe fluid recess communicating with at least a portion of the heat exchange pipe, respectively, and the upper left passage cap and the lower left passage cap may be unitarily formed, and the upper right passage cap and the lower right passage cap may be unitarily formed.

In some embodiments, corners of the left passage cap and the right passage cap may extend in a straight line in a vertical direction at a portion corresponding to the first inclined portion and the second inclined portion of the front plate and the rear plate.

In some embodiments, the heat exchanger may further include an inlet configured to allow water to be introduced through two or more third heat exchange pipes from among the third heat exchange pipes, wherein a resistance turbulator may be disposed at one of the two or more third heat exchange pipes that is disposed adjacent to the inlet.

In some embodiments, the heat-return-pipe fluid recess in the left passage cap may form passages having a parallel structure, and a recess may be defined between the passages having the parallel structure.

According to one or more embodiments of the present disclosure, the heat exchanger may maintain airtightness between the sensible heat exchanger and the latent heat exchanger without a separate airtight member by unitarily forming the sensible heat exchanger and the latent heat exchanger into a unitary structure.

In addition, by unitarily forming the sensible heat exchanger and the latent heat exchanger, the manufacturing process, the manufacturing cost, and the number of parts may be reduced.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE DRAWINGS

The above and other features and aspects of the present disclosure of invention will be more clearly understood from the following detailed description taken in conjunction with the accompanying drawings, in which.

DETAILED DESCRIPTION

Figure 1:
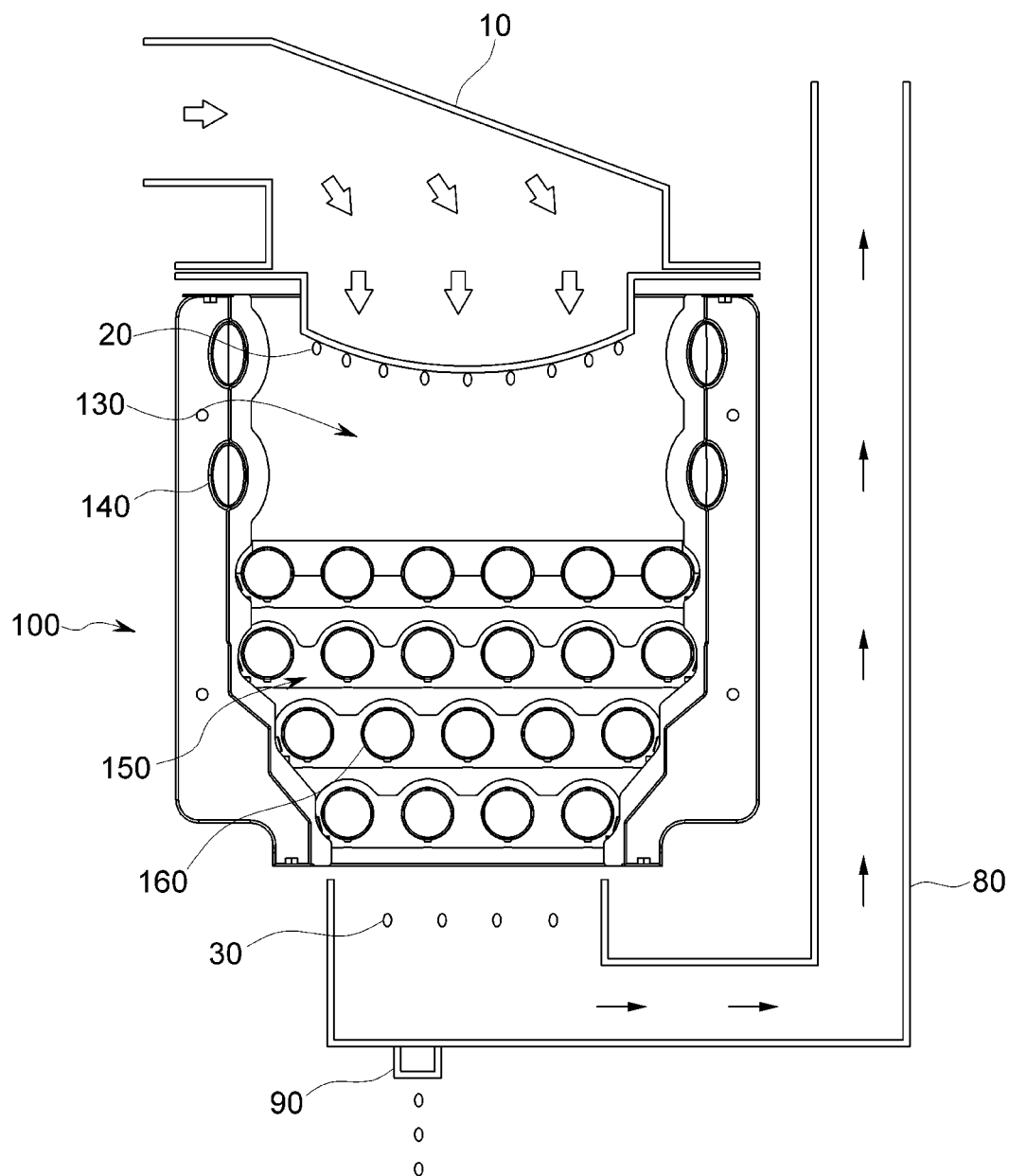
FIG. 1 is a view schematically illustrating a combustion process of a gas boiler using a heat exchanger according to various embodiments of the present disclosure.

Hereinafter, for convenience of description, some embodiments of the present disclosure will be described with reference to exemplary drawings. In describing reference numerals for components of each drawing, the same components are denoted by the same reference numerals as much as possible even if they are displayed on different drawings.

The terms or words used in the present disclosure and claims should not be limited to their ordinary or dictionary meanings and should be interpreted as meaning and concept consistent with the technical idea of the present disclosure based on the principle that the inventor may appropriately define the concept of the term in order to best describe his or her invention. In addition, in describing the components of the embodiment of the present disclosure, terms such as first, second, A, B, (a), (b), and the like may be used. These terms are only for distinguishing the component from other components, and the essence, order, or sequence of the component is not limited by the term. When it is described that a component is 'connected' or 'coupled' to another component, the component may be directly connected or coupled to the another component, but it should be understood that another component may be 'connected' or 'coupled'. between the component and the another component.

Accordingly, embodiments described in the present disclosure and the configurations illustrated in the drawings are, for example, merely preferred embodiments of the present disclosure and do not represent all the technical spirit of the present disclosure, so it should be understood that at the time of the present application, there may be various equivalents and modifications that may replace them. In addition, detailed descriptions of well-known functions and configurations that may unnecessarily obscure the gist of the present disclosure will be omitted.

Hereinafter, a heat exchanger 100 according to various embodiments of the present disclosure will be described in detail with reference to the accompanying drawings.

Figure 2:
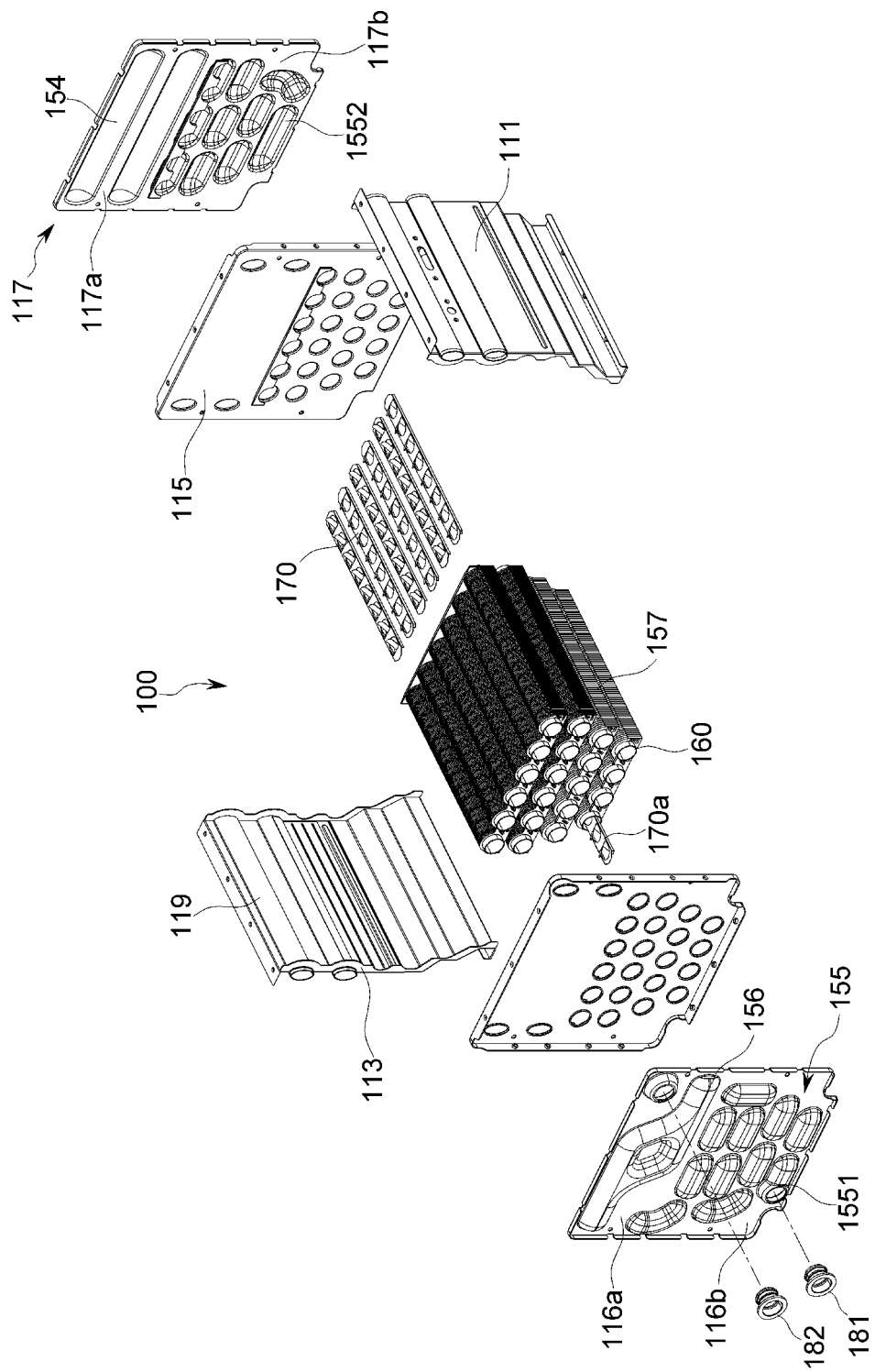
FIG. 2 is an exploded perspective view illustrating a heat exchanger according to various embodiments of the present disclosure.
Figure 3:
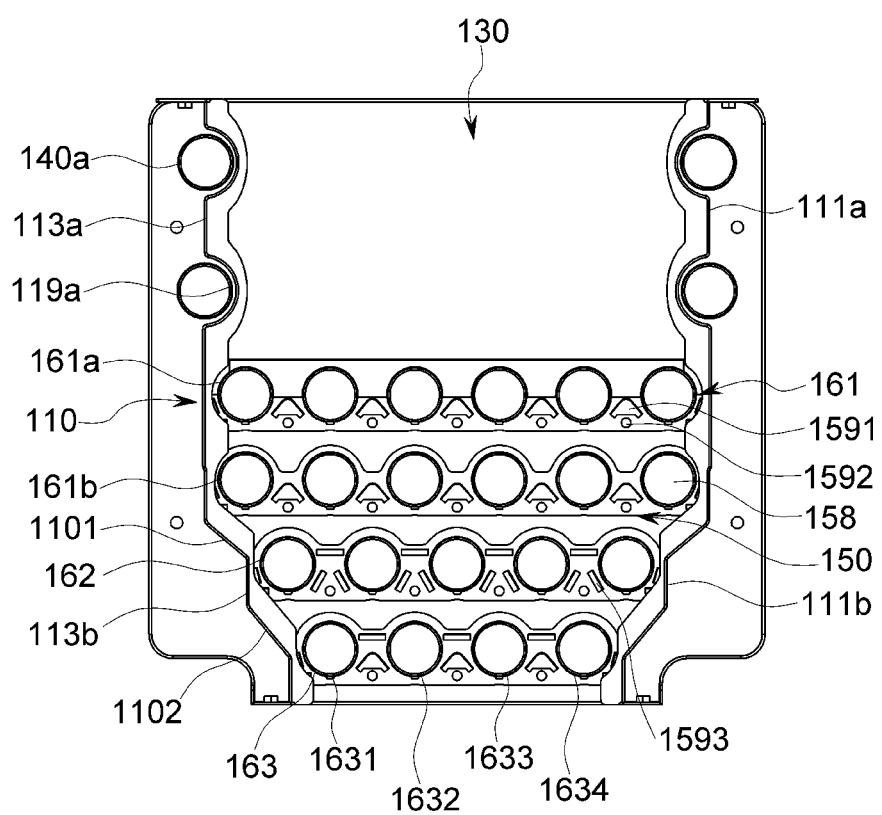
FIG. 3 is a cross-sectional side view illustrating a heat exchanger according to an embodiment of the present disclosure.
Figure 4:
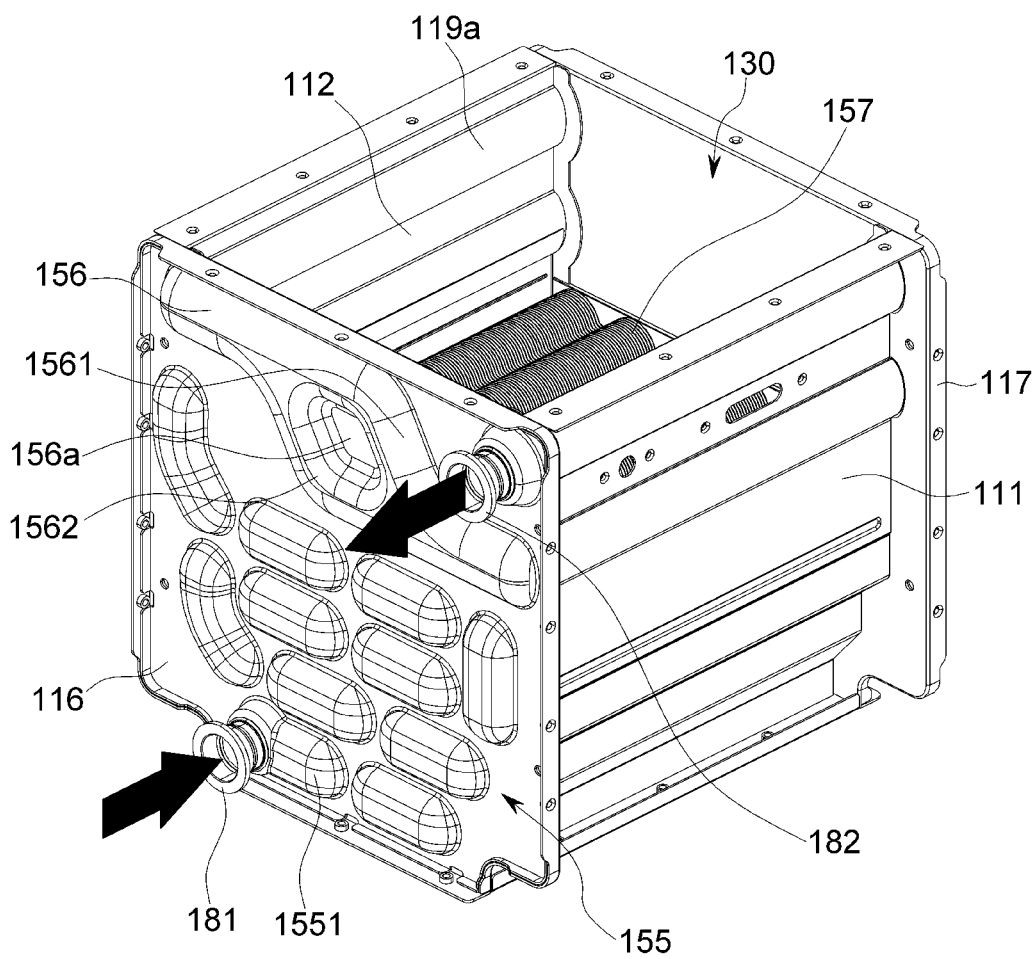
FIG. 4 is a perspective view illustrating a flow of a fluid in the heat exchanger of FIG. 3.
Figure 5:
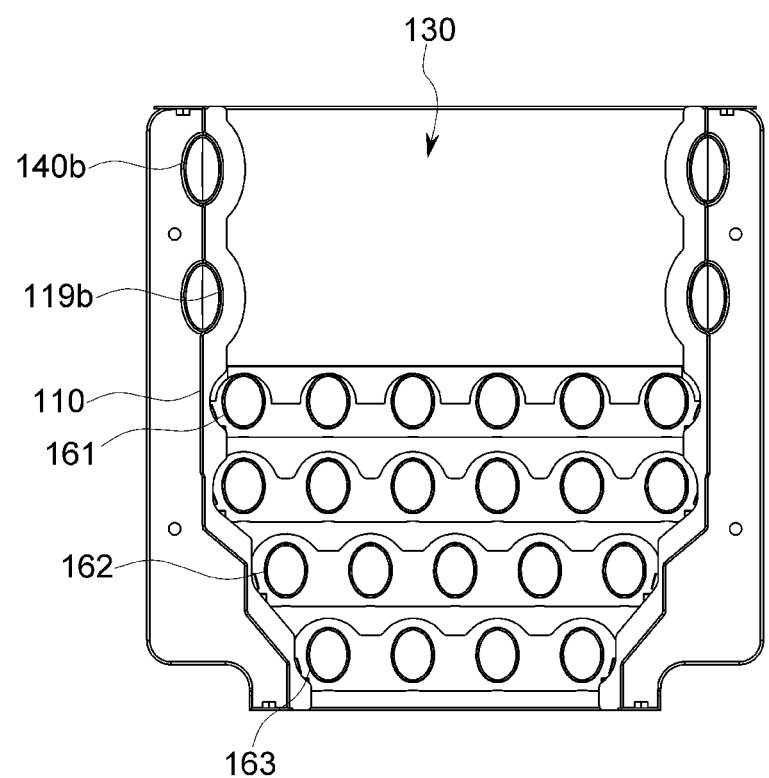
FIG. 5 is a cross-sectional side view illustrating a heat exchanger according to another embodiment of the present disclosure.

FIG. 1 is a view schematically illustrating a combustion process of a gas boiler using a heat exchanger 100 according to various embodiments of the present disclosure; FIG. 2 is an exploded perspective view illustrating a heat exchanger 100 according to various embodiments of the present disclosure; FIG. 3 is a cross-sectional side view illustrating a heat exchanger 100 according to an embodiment of the present disclosure; FIG. 4 is a perspective view illustrating a flow of a fluid in the heat exchanger 100 of FIG. 3; and FIG. 5 is a cross-sectional side view illustrating a heat exchanger 100 according to another embodiment of the present disclosure.

Referring to FIG. 1, a gas burner 20 is installed at an upper portion of a heat exchanger 100 according to various embodiments of the present disclosure such that a mixture gas of gas and air introduced through a ventilation passage (e.g., flow path) 10 ignites and combusts at a combustor 130. A fluid in a heat exchange pipe 160 disposed below the combustor 130 is heated by using a combustion gas generated by the combustion of the mixture gas in the combustor 130. Since a combustion heat is reduced downwardly of the combustor 130 of the heat exchanger 100, and since a cold fluid is introduced into the heat exchange pipe 160 disposed therebelow, it may be designed so that the combustion gas may be condensed at a certain height from among the plurality of heat exchange pipes 160. At a lowermost portion of the heat exchanger 100, an outlet 90 for a condensed water 30 through which the condensed water 30 is discharged and an exhaust passage 80 through which an exhaust gas is exhausted may be formed. In the present disclosure, a wet-type heat exchanger in which a heat return pipe 140 is disposed at an outer wall of the combustor 130 is characterized in that the combustor 130 and the heat exchange portion 150 constituting a body 110 are unitarily formed into a unitary (e.g., monolithic) structure.

Referring to FIGS. 2 to 5, the heat exchanger 100 according to various embodiments of the present disclosure may include the body 110, the combustor 130, the heat exchange portion 150, and the heat return pipe 140.

First, the body 110 is coupled to a lower end portion of a gas burner 20, and a certain space is defined therein. In an embodiment, the body 110 may include a front plate 111 and a rear plate 113 disposed to face each other, and further include a left passage cap 116 and a right passage cap 117 coupled to opposite side ends of the front plate 111 and the rear plate 113 to define the space.

The combustor 130 in which combustion of the combustion gas occurs by the gas burner 20 is formed at an upper portion of an internal space of the body 110, and the heat exchange portion 150 in which the heat exchange pipe 160 is provided to heat an internal fluid by using a sensible heat or a latent heat of condensation of the combustion gas is formed at a lower portion of the internal space. The body 110 may include or be formed of a stainless (e.g., stainless steel) material or a copper material.

The front plate 111 and the rear plate 113 may be provided in a shape symmetric to each other. The front plate 111 and the rear plate 113 forming the combustor 130 and the heat exchange portion 150 may be unitarily (e.g., monolithically) provided without a joint such as welding.

In an embodiment, the front plate 111 and the rear plate 113 may include an upper front plate 111a and an upper rear plate 113a forming an exterior of the combustor 130, and a lower front plate 111b and a lower rear plate 113b forming an appearance of the heat exchange portion 150, respectively. In addition, the upper front plate 111a and the lower front plate 111b may be unitarily formed, and the upper rear plate 113a and the lower rear plate 113b may be unitarily formed.

In an embodiment, the front plate 111 and the rear plate 113 may include the upper front plate 111a and the upper rear plate 113 disposed at a height corresponding to the combustor 130 so as to be in contact with the heat return pipe 140 and may further include the lower front plate 111b and the lower rear plate 113b disposed at a height corresponding to the heat exchange portion 150 below the upper rear plate 113a and the upper rear plate 113, respectively. In addition, the upper front plate 111a and the lower front plate 111b may be unitarily formed, and the upper rear plate 113a and the lower rear plate 113b may be unitarily formed.

Herein, the upper front plate 111a and the lower front plate 111b described above may not be physically separated, but may be described as being separated conceptually. In addition, the upper rear plate 113a and the lower rear plate 113b may also be described as being separated physically and/or conceptually.

In an embodiment, in the present disclosure, the front plate 111 and the rear plate 113, and the left passage cap 116 and the right passage cap 117 constituting the body 110 may all include or be formed of a substantially same material, for example, a stainless material. Accordingly, in the present disclosure, in forming the body 110 by coupling the front plate 111, the rear plate 113, the left passage cap 116 and the right passage cap 117, a coupling portion may be bonded (e.g., joined) in a scheme such as brazing.

That is, in the present disclosure, since the coupling among each component of the body 110 may be brazed without a separate assembly process, a separate sealing structure or assembly structure for preventing water leakage is unnecessary.

The front plate 111 and/or the rear plate 113 corresponding to the combustor 130 of the body 110 may include a concave portion 119 concavely protruding inward corresponding to a shape of an outer circumferential surface of the heat return pipe 140. In an embodiment, when the heat return pipe 140 is provided in a circular shape (e.g., circular cross-sectional shape) as illustrated in FIG. 3, the concave portion 119 may also be provided in a corresponding shape. In another embodiment, when the heat return pipe 140 is provided in an elliptical (e.g., oval) shape (e.g., cross-sectional shape) as illustrated in FIG. 5, the concave portion 119 may also be provided in a shape corresponding to the elliptical shape. Accordingly, at least a portion of the heat return pipe 140 may be in surface contact with an outer surface of the concave portion 119 of the body 110. Preferably, half of a circumference of the outer circumferential surface of the heat return pipe 140 may be provided so as to be in surface contact with the outer surface of the concave portion 119. This is to maximize heat transfer efficiency by maximizing a contact area between the heat return pipe 140 and the body 110, thereby recovering heat emitted (e.g., discharged) through the body 110 as much as possible.

In addition, in the present disclosure, cooling effects of the body 110 may be realized through the heat return pipe 140. The heat return pipe 140 in which water flows is disposed at an outer surface of the front plate 111 and/or the rear plate 113 corresponding to the combustor 130 such that the front plate 111 and/or the rear plate 113 may be substantially prevented from becoming too hot due to combustion in the combustor 130. Accordingly, in the present disclosure, by eliminating the need to dispose a separate fireproof material or insulator in the combustor 130, the combustor 130 may be simply structured by unitarily forming the combustor 130 and the heat exchange portion 150 to form the body 110.

The left passage cap 116 and the right passage cap 117 of the body may include an upper left passage cap 116a and an upper right passage cap 117a which form an exterior of the combustor 130 and have a heat-return-pipe fluid recess 156 communicating with at least a portion of the heat return pipe 140, and may further include a lower left passage cap 116b and a lower right passage cap 117b which have a heat-exchange-pipe fluid recess 155 communicating with at least a portion of the heat exchange pipe 160, respectively. In an embodiment, the upper left passage cap 116a and the lower left passage cap 116b may be unitarily formed. The upper right passage cap 117a and the lower right passage cap 117b may be unitarily formed. However, in such an embodiment, the upper left/right passage cap and the lower left/right passage cap may not be physically separated, but may be conceptually separated.

In an embodiment, from among the fluid recesses 155 for the heat exchange pipe in the lower left passage cap 116a, a fluid recess at a lower end side portion which is formed to communicate with an inlet 181 may be described as a first fluid recess 1551. The first fluid recess 1551 may allow water introduced from the inlet 181 to flow into any one of a plurality of third heat exchange pipes.

In another embodiment, the first fluid recess 1551 may allow water introduced from the inlet 181 to flow simultaneously into two of the plurality of third heat exchange pipes 163 (e.g., 1631 and 1632 in FIG. 3). The first fluid recess 1551 may be formed to cover two heat exchange pipes (e.g., 1631 and 1632 in FIG. 3) through which water is introduced from among the third heat exchange pipes. In a case where the inlet 181 is disposed between two adjacent ones (e.g., 1631 and 1632 in FIG. 3) of the plurality of heat exchange pipes, in order for the water introduced from the inlet to flow evenly into the two heat exchange pipes, a distance from the inlet to each of the two heat exchange pipes and/or a distance between the two heat exchange pipes should be secured to at least a certain distance, and thus an overall size of the heat exchanger may increase. In an embodiment, the inlet 181 may communicate with the first fluid recess 1551 to be disposed coaxially with any one (e.g., 1631 in FIG. 3) of the plurality of third heat exchange pipes 163. In an embodiment, in a case where the first fluid recess 1551 is formed such that the water introduced from the inlet 181 is simultaneously introduced into two (e.g., 1631 and 1632 in FIG. 3) of the plurality of third heat exchange pipes 163, a resistance turbulator (e.g., 170a in FIG. 2) may be disposed at only one of the two heat exchange pipes (e.g., 1631 and 1632 in FIG. 3) into which water is introduced. In a case where the resistance turbulator 170a is disposed relatively close to or coaxially with any one of the two third heat exchange pipes (e.g., 1631 or 1632 in FIG. 3), it may serve to generate a resistance to the flow of water introduced into the third heat exchange pipe (e.g., 1631 in FIG. 3) disposed closer to or coaxially with the inlet 181. For example, the resistance turbulator 170a may be disposed only in the heat exchange pipe (e.g., 1631 in FIG. 3) that is relatively close to the inlet 181 from among the two heat exchange pipes (e.g., 1631 and 1632 in FIG. 3) into which water is introduced. This is because the inflow of water may be biased to the heat exchange pipe relatively close to the inlet 181 from among the two heat exchange pipes, and thus, resistance is given to the heat exchange pipe in which the inflow of water may be biased to form a turbulence and to slow the flow of water such that the water introduced through the inlet may be evenly distributed and introduced into the two heat exchange pipes. In an embodiment, the resistance turbulator 170a may be formed in a substantially same shape as the above-described turbulator 170. In an embodiment, as described above, when the first fluid recess 1551 disposed at the lower left passage cap 116a is formed to cover the two heat exchange pipes (e.g., 1631 and 1632 in FIG. 5) into which water is introduced from among the third heat exchange pipes, a second fluid recess 1552 disposed on an opposite side at the lower right passage cap 117a may be formed to cover a total of three heat exchange pipes including two heat exchange pipes (e.g., 1631 and 1632 in FIG. 5) into which water is introduced and another third heat exchange pipe (e.g., 1633 in FIG. 5). In such a case, the water introduced into the two heat exchange pipes 1631 and 1632 through the inlet 181 may flow in an opposite direction again through the adjacent heat exchange pipe 1633.

In an embodiment, corners of the left passage cap 116 and the right passage cap 117 may extend in a straight line in a vertical direction at a portion corresponding to a first inclined portion 1101 and a second inclined portion 1102 of the front plate 111 and the rear plate 113.

In an exemplary embodiment, the front plate 111 and the rear plate 113 comprise first inclined portions 1101 formed to be inclined and become closer to each other in a direction from a position of a lower end of the first heat exchange pipe 161 toward a position of the second heat exchange pipe 162, and second inclined portions 1102 formed to be inclined and become closer to each other in a direction from a position of the second heat exchange pipe 162 toward a position of the third heat exchange pipe 163.

As illustrated in FIG. 3 or FIG. 5, the heat exchange portion 150 may be formed narrower (e.g., tapered) toward a lower side when viewed from one side, and with such a structure, the condensed water 30 may be easily discharged.

Inside the heat exchange portion 150, the plurality of heat exchange pipes 160 may be disposed at predetermined intervals between the front plate 111 and the rear plate 113, in parallel to the front plate 111 and the rear plate 113. In the present disclosure, the heat exchange pipe 160 may have a circular or oval (e.g., elliptical) cross-section. In an embodiment, the heat exchange pipe and the heat return pipe may include an oval pipe having an oval cross-section. A material of the heat exchange pipe and the heat return pipe may be provided including various materials having high corrosion resistance and high thermal conductivity, including a stainless (e.g., stainless steel) or a copper material. The oval pipe having an oval cross-section has higher thermal conductivity than a pipe having a circular cross-section, as may be seen from a known total nusselt number, so it is more efficient. In addition, when cross-sections of the heat exchange pipe and the heat return pipe are formed in an oval shape, a friction coefficient may be about 40% as compared to that of a pipe having a circular cross-section, so it may be possible to reduce frictional pressure loss due to the pipe and smooth flow of the heat source.

In an embodiment, the heat exchange pipe 160 may include a first heat exchange pipe 161 disposed at an upper portion of the heat exchange portion 150 to be adjacent to the combustor 130 so as to heat an internal fluid by using a sensible heat of the high-temperature combustion gas burned in the combustor 130. The heat exchange pipe 160 may include, in a lower portion the heat exchange portion 150, a third heat exchange pipe 163 disposed below the combustor 130 to heat the internal fluid by using a latent heat of condensation of the combustion gas. In addition, the heat exchange pipe 160 may include a second heat exchange pipe 162 disposed between the first heat exchange pipe 161 and the third heat exchange pipe 163.

In an embodiment, the second heat exchange pipe 162 may be provided to heat the internal fluid by using the latent heat of condensation of the combustion gas. The second heat exchange pipe 162 may be provided to heat the internal fluid by using a sensible heat of the combustion gas. Alternatively, the second heat exchange pipe 162 may be provided to heat the internal fluid by using the sensible heat and the latent heat of condensation of the combustion gas.

In an embodiment, the first heat exchange pipe 161 may include a first number of upper first heat exchange pipes 161a (e.g., provided in the first number) to be spaced apart from each other in a horizontal direction between the front plate 111 and the rear plate 113, and may further include a lower first heat exchange pipe 161b having the same arrangement as the upper first heat exchange pipes 161a and being spaced apart from a lower side of the upper first heat exchange pipes 161a by a predetermined interval. In such an embodiment, the first number may be six as illustrated in FIG. 3 or FIG. 5, but embodiments are not limited thereto.

In an embodiment, the second heat exchange pipe 162 may include a second number of the second heat exchange pipes (e.g., provided in the second number) and may be disposed to be spaced apart from each other in the horizontal direction between the front plate 111 and the rear plate 113.

In such a case, the second number may be five, but embodiments are not limited thereto. Each of the second heat exchange pipes 162 may be positioned between each of the first heat exchange pipes 161.

In an embodiment, the third heat exchange pipe 163 may include a third number of the third heat exchange pipes (e.g., provided in the third number), the third number being less than the second number, and each of the third heat exchange pipes 163 may be disposed between each of the second heat exchange pipes 162. In such a case, the third number may be four, but embodiments are not limited thereto.

In an embodiment, as illustrated in FIG. 4, when a cold fluid is introduced through the inlet 181 connected to the third heat exchange pipe 163 disposed at a lowermost side from among the heat exchange pipes 160, the fluid may be heated while flowing to the heat return pipe 140 through the connection pipe 145 via the second heat exchange pipe 162 and the first heat exchange pipe 161, and a heating water may be supplied indoors through the outlet 182.

In an embodiment, as illustrated in FIG. 2, the turbulator 170 that induces turbulence (e.g., vortex) in the flow of the fluid may be disposed inside the heat exchange pipe 160. When the fluid flows, turbulence occurs while passing through the turbulator 170, such that heat exchange efficiency may be maximized. It is illustrated in FIG. 2 that the turbulator 170 is provided only in the first heat exchange pipe 161, but embodiments are not limited thereto. The turbulator 170 is disposed on a passage (e.g., flow path) to complicate the flow of the fluid to generate turbulence, and various known structures may be applied.

Referring to FIG. 2, a plurality of heat exchange pins 157 for increasing a heat transfer rate may be disposed on an outer circumferential surface of the heat exchange pipe 160. The plurality of heat exchange pins 157 may be disposed to be spaced apart from each other at predetermined intervals along a longitudinal direction of the heat exchange pipe 160.

The heat exchange pin 157 may each be formed in a plate shape, and the plurality of heat exchange pins 157 may be stacked in parallel. The heat exchange pins 157 may include or be formed of a metal material having a high thermal conductivity and may facilitate transfer of heat from a high-temperature combustion gas to the heat exchange pipe 160. A plurality of through-holes 158 may be defined in the heat exchange pin 157 through which the heat exchange pipe 160 may be inserted. The through hole 158 may be provided in a shape corresponding to a shape of the heat exchange pipe 160. A flow hole 159 may be defined through the heat exchange pin 157 between a pair of adjacent through-holes 158 to increase fluidity of the combustion gas.

In an embodiment, the flow hole 159 may include an upper flow hole 1591 having a first shape which becomes wider toward bottom adjacent to a circumference of a neighboring through-hole 158 when viewed from either one of the left or right side, as illustrated in FIG. 3. The flow hole 159 may include a lower flow hole 1592 distinguished (e.g., separated) from the upper flow hole 1591 having the first shape, and disposed at a height corresponding to a lower end of the circumference of the through hole 158 below the upper flow hole 1591 having the first shape. In an embodiment, the lower flow hole 1592 may be formed in a circle or oval shape smaller than the through hole 158. In another embodiment, a pair of upper flow holes 1593 having a second shape and extending in a direction away from each other as going down toward the circumference of the neighboring through-hole 158 may be provided. In such a case, the lower flow hole 1592 may be disposed between the pair of upper flow holes 1593 having the second shape.

Opposite ends of each of the heat exchange pipe 160 and the heat return pipe 140 may be fixed to one side of the body 110 through an inner baffle plate (e.g., partition plate) 115.

The left passage cap 116 and the right passage cap 117 may each be disposed outside the inner baffle plate 115, such that along with the front plate 111 and the rear plate 112 described above, a space may be formed therein. The plurality of fluid recesses 155 for the heat exchange pipe may be formed in the left passage cap 116 and the right passage cap 117 so that the fluids of the first to third heat exchange pipes 160 may each be sequentially communicated therewith. In addition, the heat-return-pipe fluid recess 156 may be formed in the left passage cap 116 and the right passage cap 117 and above the heat-exchange-pipe fluid recess 155. Each of the fluid recesses 155 and 156 may be formed to be convex from the passage caps 116 and 117 in the left and right directions, so that a passage (e.g., flow path) may be formed and water flows therein. Referring to FIG. 2, in a structure in which the heat return pipes are arranged in two upper and lower rows, the heat-return-pipe fluid recess 156 formed in the left passage cap 116 connected to the connection pipe 145 may be formed so that the front-plate-side heat return pipe disposed on the relatively lower side from among the front-plate-side heat return pipes of the two upper and lower rows and the rear-plate-side heat return pipe disposed on the relatively upper side from among the rear-plate-side heat return pipes of the two upper and lower rows may be connected to each other in a diagonal direction. In an embodiment, the heat-return-pipe fluid recess 156 formed in the left passage cap 116 forms a passage (flow path) so that water flows from the front-plate-side heat return pipe disposed on the relatively lower side toward the rear-plate-side heat return pipe disposed on the relatively upper side, and in such a case, the passage may be formed into a structure in which two-way passages (e.g., 1561 and 1562 of FIG. 4) are arranged in parallel. A recess formed concavely inward may be disposed between the passages of the two-way parallel structures, and through such arrangement of the recesses, a passage having a parallel structure may be formed. With the parallel structure of the passage, occurrence of a turbulence may be substantially minimized in the wide passage, and by arranging the concave portion, a strength of the left passage cap 116 may be secured while substantially maximizing an area of the passage.

Heat-return-pipe fluid recesses 154 formed in the right passage cap 117 may be vertically spaced apart from each other and may extend in parallel to each other.

In an embodiment, any one of the left passage cap 116 and the right passage cap 117 may be coupled to the connection pipe 145 for communicating the heat exchange pipe 160 disposed on the lower side with the heat return pipe 140 disposed on the upper side.

In an embodiment, the left passage cap 116 and the right passage cap 117 may include the upper left passage cap 116a and the upper right passage cap 117a which form an appearance of the combustor 130 and have the heat-return-pipe fluid recesses 154 and 156 communicating with at least a portion of the heat return pipe 140, and may further include the lower left passage cap 116b and the lower right passage cap 117b which have the heat-exchange-pipe fluid recess 155 communicating with at least a portion of the heat exchange pipe 160. The upper left passage cap 116a and the lower left passage cap 116b may be unitarily formed, and the upper right passage cap 117a and the lower right passage cap 117b may be unitarily formed.

The heat return pipe 140 may be provided outside the space so as to contact an outer surface of the body 110. The heat return pipe 140 may be provided to contact the outer surface of the body 110 at a position corresponding to the combustor 130, thereby recovering heat emitted to the outside of the combustor 130 through the body 110. At least a portion of an outer circumferential surface of the heat return pipe 140 may be in surface contact with an outer surface of the concave portion 119 formed in the front plate 111 and the rear plate 112. In an embodiment, a longitudinal cross-section of the heat return pipe 140 may be formed in a circular or oval shape. A half of a circumference of the outer circumferential surface of the heat return pipe 140 may be in surface contact with the outer surface of the concave portion 119 so that a contact area may be substantially maximized, thereby substantially maximizing heat transfer efficiency.

As described above, in the heat exchanger 100 according to various embodiments of the present disclosure, the sensible heat exchanger and the latent heat exchanger may be unitarily formed in one body 110, so that airtightness between the sensible heat exchanger and the latent heat exchanger may be maintained without a separate sealing member. In addition, by unitarily forming the sensible heat exchanger and the latent heat exchanger, it is possible to reduce the manufacturing process, manufacturing cost, and number of parts.

In the above, even though it has been described that all the components constituting the embodiment of the present disclosure operate by being combined or coupled to one unit, the present disclosure is not necessarily limited to this embodiment. That is, within the scope of the present disclosure, all the components may operate by selectively coupling one or more units. In addition, terms such as 'include', 'comprise', or 'have' described above mean that the component may be included unless otherwise stated, so it should be construed that other components are not excluded, and rather, other components may further be included. All terms, including technical and scientific terms, have the same meaning as commonly understood by one of ordinary skill in the art to which the present disclosure belongs, unless otherwise defined. Terms commonly used, such as those defined in the dictionary, should be interpreted as being consistent with the contextual meaning of the related art, and are not interpreted in an ideal or excessively formal meaning unless explicitly defined in the present disclosure.

The above description is merely illustrative of the technical spirit of the present disclosure, and various modifications and variations will be possible without departing from the essential characteristics of the present disclosure by those skilled in the art to which the present disclosure pertains. Accordingly, the embodiments disclosed in the present disclosure are not intended to limit the technical spirit of the present disclosure, but to explain, and the scope of the technical spirit of the present disclosure is not limited by these embodiments. The protection scope of the present disclosure should be construed by the following claims, and all technical ideas within the scope equivalent thereto should be construed as being included in the scope of the present disclosure.

What is claimed is:

1. A heat exchanger for heating a fluid flowing through a pipe by using a combustion gas, the heat exchanger comprising:
    a body including upper and lower ends which are open and having a space formed in the body to allow the combustion gas to pass through the space, the body comprising a front plate and a rear plate, and a left passage cap and a right passage cap coupled to opposite side ends of the front plate and the rear plate;
    a combustor formed in an upper portion of the space in which combustion of the combustion gas occurs;
    a heat exchange portion formed below the combustor and provided with a heat exchange pipe configured to heat an fluid by using the combustion gas; and
    a plurality of heat return pipes provided outside the space so as to be in contact with an outer surface of the body, the plurality of heat return pipes being spaced apart from each other in a height direction of the body,
    wherein the body comprises:
        an inlet formed at one of the left passage cap or the right passage cap and guiding inflow of the fluid into one of the left passage cap and the right passage cap;
        a concave portion formed at the front plate and the rear plate to protrude concavely inward so as to correspond to a shape of an outer circumferential surface of the plurality of heat return pipes;
        a heat-return-pipe fluid recess formed at the left passage cap or the right passage cap that includes the inlet, where the heat-return-pipe fluid recess guiding such that the fluid in a heat return pipe disposed relatively lower among the plurality of heat return pipes disposed outside the front plate is introduced to one side of the heat-return-pipe fluid recess and the fluid moves to a heat return pipe disposed relatively higher among the plurality of heat return pipes disposed outside the rear plate through another side of the heat-return-pipe fluid recess; and
        a recess formed between the one side of the heat-return-pipe fluid recess and the another side of the heat-return-pipe fluid recess and allowing the heat-return-pipe fluid recess to form a two-way passage structure, and
    the heat exchange pipe comprises:
        a first heat exchange pipe disposed in an upper area of the heat exchange portion to be adjacent to the combustor so as to heat the fluid by using a sensible heat of the combustion gas;
        a plurality of third heat exchange pipes disposed below the combustor to heat the fluid by using a latent heat of condensation of the combustion gas; and
        a resistance turbulator disposed in a third heat exchange pipe among the plurality of third heat exchange pipes that is disposed adjacent to the inlet to impart resistance to the fluid.

2. The heat exchanger of claim 1, wherein the heat exchange pipe further comprises a second heat exchange pipe disposed between the first heat exchange pipe and the third heat exchange pipe.

3. The heat exchanger of claim 2, wherein the second heat exchange pipe is configured to heat the fluid by using at least one of the sensible heat and the latent heat of condensation of the combustion gas.

4. The heat exchanger of claim 1, wherein each of the heat exchanger and the heat return pipe has a circular or oval cross-sectional shape.

5. The heat exchanger of claim 1, wherein a plurality of heat exchange pins for increasing a heat transfer rate are disposed on an outer circumferential surface of the heat exchange pipe to be spaced apart from each other at predetermined intervals.

6. The heat exchanger of claim 4, wherein a half of a circumference of an outer circumferential surface of the heat return pipe is in surface contact with an outer surface of the concave portion.

7. The heat exchanger of claim 2, wherein a connection pipe connecting the heat exchange pipe and the heat return pipe is coupled to the left passage cap.

8. The heat exchanger of claim 7 wherein the front plate and the rear plate comprise an upper front plate and an upper rear plate forming an exterior of the combustor, and a lower front plate and a lower rear plate forming an exterior of the heat exchange portion, and
the upper front plate and the lower front plate are unitarily formed, and the upper rear plate and the lower rear plate are unitarily formed.

9. The heat exchanger of claim 7, wherein the front plate and the rear plate comprise the upper front plate and the upper rear plate disposed at a height corresponding to the combustor to contact the heat return pipe, and the lower front plate and the lower rear plate disposed below the upper front plate and the upper rear plate, respectively, at a height corresponding to the heat exchange portion, and
the upper front plate and the lower front plate are unitarily formed, and the upper rear plate and the lower rear plate are unitarily formed.

10. The heat exchanger of claim 7, wherein the first heat exchange pipe comprises upper first heat exchange pipes provided in a first number to be spaced apart from each other in a horizontal direction between the front plate and the rear plate, and lower first heat exchange pipes having the same arrangement as the upper first heat exchange pipes and spaced apart from a lower side of the upper first heat exchange pipes by a predetermined distance.

11. The heat exchanger of claim 10, wherein the heat exchange pipe further comprises second heat exchange pipes disposed between the first heat exchange pipe and the third heat exchange pipe, and
wherein the second heat exchange pipes are provided in a second number less than the first number, and are spaced apart from each other in the horizontal direction between the front plate and the rear plate.

12. The heat exchanger of claim 11, wherein each of the second heat exchange pipes is positioned between each of the first heat exchange pipes.

13. The heat exchanger of claim 11, wherein third heat exchange pipes are provided in a third number less than the second number, and each of the third heat exchange pipes is positioned between each of the second heat exchange pipes.

14. The heat exchanger of claim 7, wherein the front plate and the rear plate comprise first inclined portions formed to be inclined and become closer to each other in a direction from a position of a lower end of the first heat exchange pipe toward a position of the second heat exchange pipe, and second inclined portions formed to be inclined and become closer to each other in a direction from a position of the second heat exchange pipe toward a position of the third heat exchange pipe.

15. The heat exchanger of claim 8, wherein
the left passage cap includes an upper left passage cap in which the heat-return-pipe fluid recess is formed and which forms an appearance of the combustor and a lower left passage cap in which a first fluid recess is formed to communicate with at least part of the heat exchange pipe,
the right passage cap includes an upper right passage cap in which a plurality of parallel heat-return-pipe fluid recesses spaced apart from each other in a height direction of the body are formed to communicate with at least part of the plurality of heat return pipes and a lower right passage cap in which a second fluid recess communicating with at least part of the heat exchange pipe is formed, and
the upper left passage cap and the lower left passage cap are unitarily formed, and the upper right passage cap and the lower right passage cap are unitarily formed.

16. The heat exchanger of claim 14, wherein corners of the left passage cap and the right passage cap extend in a straight line in a vertical direction at a portion corresponding to the first inclined portion and the second inclined portion of the front plate and the rear plate.

17. The heat exchanger of claim 1, wherein the fluid is introduced to at least two or more third heat exchange pipes of the plurality of third heat exchange pipes through the inlet, and the resistance turbulator is disposed in a third heat exchange pipe among the two or more third heat exchange pipes that is disposed relatively adjacent to the inlet.

* * * * *